United States Patent
Head

[11] Patent Number: 6,112,634
[45] Date of Patent: Sep. 5, 2000

[54] HIGH COVERAGE AREA BRAIDING MATERIAL FOR BRAIDED STRUCTURES

[75] Inventor: Andrew A. Head, Cincinnati, Ohio

[73] Assignee: A&P Technology, Inc., Covington, Ky.

[21] Appl. No.: 09/004,579

[22] Filed: Jan. 8, 1998

[51] Int. Cl.[7] ............................................ D04C 1/00
[52] U.S. Cl. ............................. 87/13; 87/1; 87/2; 87/5; 87/7; 87/9; 280/728.1; 280/729
[58] Field of Search .................. 280/729, 728.1; 87/1, 2, 3, 5, 7, 8, 13

[56] References Cited

U.S. PATENT DOCUMENTS

| | | | |
|---|---|---|---|
| 2,099,016 | 11/1937 | Houghton | 96/25 |
| 2,282,717 | 5/1942 | Freider | 96/25 |
| 3,815,468 | 6/1974 | Matt et al. | 87/1 |
| 4,159,027 | 6/1979 | Caillet | 138/127 |
| 4,213,634 | 7/1980 | Hoshino et al. | 280/728 |
| 4,340,091 | 7/1982 | Skelton et al. | 87/7 |
| 4,420,018 | 12/1983 | Brown, Jr. | 138/124 |
| 4,519,290 | 5/1985 | Inman et al. | 87/7 |
| 4,621,980 | 11/1986 | Reavely et al. | 416/226 |
| 4,741,087 | 5/1988 | Plummer | 87/7 |
| 4,860,631 | 8/1989 | Aoshiro | 87/9 |
| 4,907,624 | 3/1990 | Jonasson | 138/125 |
| 4,946,721 | 8/1990 | Kindervater et al. | 428/36.1 |
| 4,977,016 | 12/1990 | Thornton et al. | 428/225 |
| 5,006,291 | 4/1991 | Fish | 264/103 |
| 5,010,663 | 4/1991 | Thornton et al. | 38/52 |
| 5,019,057 | 5/1991 | Truckai | 604/282 |
| 5,088,735 | 2/1992 | Shigetoh | 273/80 R |
| 5,110,666 | 5/1992 | Menzel et al. | 428/196 |
| 5,143,374 | 9/1992 | Shibasaki | 273/80 B |
| 5,178,408 | 1/1993 | Barrenscheen et al. | 280/728 |
| 5,186,992 | 2/1993 | Kite, III | 428/36.3 |
| 5,222,932 | 6/1993 | Fontecchio | 493/210 |
| 5,236,775 | 8/1993 | Swoboda et al. | 428/225 |
| 5,277,966 | 1/1994 | Nakayama et al. | 428/225 |
| 5,296,278 | 3/1994 | Nishimura et al. | 428/36.1 |
| 5,336,538 | 8/1994 | Kitamura | 428/35.2 |
| 5,356,680 | 10/1994 | Krummheuer et al. | 428/36.1 |
| 5,375,878 | 12/1994 | Ellerbrok | 280/743 |
| 5,401,566 | 3/1995 | Magee et al. | 428/266 |
| 5,414,211 | 5/1995 | Chan | 174/36 |
| 5,419,231 | 5/1995 | Earle, III et al. | 87/1 |
| 5,421,128 | 6/1995 | Sharpless et al. | 52/2.13 |
| 5,441,489 | 8/1995 | Utsumi et al. | 604/280 |
| 5,441,798 | 8/1995 | Nishimura et al. | 428/229 |
| 5,443,422 | 8/1995 | Heimberger | 464/57 |
| 5,443,902 | 8/1995 | Leyderman | 264/29.1 |
| 5,474,836 | 12/1995 | Nishimura et al. | 428/229 |
| 5,503,197 | 4/1996 | Bower et al. | 139/435.1 |
| 5,504,274 | 4/1996 | McCabe et al. | 174/36 |
| 5,556,687 | 9/1996 | McMillin | 428/113 |
| 5,562,126 | 10/1996 | Briand et al. | 138/127 |
| 5,619,903 | 4/1997 | Rogers et al. | 87/7 |
| 5,713,598 | 2/1998 | Morita et al. | 280/743.1 |
| 5,952,250 | 9/1999 | Kim et al. | 442/203 |

*Primary Examiner*—William Stryjewski
*Attorney, Agent, or Firm*—Darby & Darby

[57] ABSTRACT

A braided structure produced by strands of a braiding material consisting of multiple yarn ends of multifilament fibers oriented side-by-side or in parallel to form a generally single layer band of yarn ends and treated with a suitable forming material in order to set such orientation. The braiding material can then be used to form strands for producing a braided structure. The braided structure resulting from the braiding material of our invention has a high coverage area and a high width to thickness ratio.

27 Claims, 5 Drawing Sheets

FIG. 10

HIGH COVERAGE AREA BRAIDING MATERIAL FOR BRAIDED STRUCTURES

FIELD OF THE INVENTION

This invention relates to braiding materials for braided structures.

BACKGROUND OF THE INVENTION

Braided structures are produced by interlacing strands (containing fibers) of braiding material to form a braided pattern. Each strand has a width measured by the distance between its outmost edges exposed on the surface of the braided structure. Each strand also has a thickness measured by the distance between the fibers on the outer and inner surfaces of the braided structure (or the distance along the axis perpendicular to the width). The width to thickness ratio of such strand is referred to as the aspect ratio. In addition, the braided structure has a coverage area. Depending on the width of the strands and the angle of the braided structure (also called the braiding angle), interlacing the strands can produce gaps where the strands cross each other. The coverage area can be expressed as the amount of the braided structure surface area which contains braiding material or fiber.

There are a myriad of uses for high coverage area braided structures produced by high width to thickness ratio braiding material. One example is a new generation of automotive inflatable safety devices, or airbags. Airbags are installed in automobiles in order to protect the vehicle's occupants from injury. During a collision, the occupants are often thrown, causing the head or upper body to hit objects in the passenger compartment. Rapidly inflating airbags prevent bodily contact with such objects.

Certain airbags have been developed to exploit a particular feature of braided structures, namely that such structures shrink in length as they expand in diameter. This feature, essentially the well-known Chinese finger trap effect in reverse, allows for airbags constructed from braided structures to be elongated and stowed in a vehicle and, upon inflation from an impact initiated gas generator, to shorten in length, making a straight line between their attachment points. This feature allows such airbags to self deploy into a position suitable to provide the occupants with an appropriately positioned protective cushion. One example of an appropriate position is for side impact head protection. For this use, elongated, deflated airbags are stowed above the vehicles side window between the roof and the interior trim and are connected generally to a first point near the base of the windshield and a second point above the rear passenger door. Upon inflation, such airbags simultaneously shorten in length and expand in diameter to provide a diagonally positioned side cushion across the adjacent door and window, between the door and window and the vehicle's front seat occupant.

For the airbag applications just described, a braided structure is placed over a gas tight inflatable bladder (this application for the braided structure is also referred to as an airbag cover). It is important that the structure have a high coverage area of fibers over the gas tight inflatable bladder. The high degree of coverage is essential to reinforce the bladder material in order to prevent it from popping or rupturing when initially inflated and when receiving additional loads resulting from impact. It is also important, in at least a side impact airbag application, for the braiding material to have a small thickness or thin cross section so that the deflated airbag can be stowed in the relatively small area between the roof and the interior trim.

As is known in the braiding art, braiding machines include numerous carriers, each of which hold a strand of braiding material. Each strand (also referred to as a tow bundle) can consist of, for example, a single multifilament textile fiber or a multifilament yarn (also referred to as a yarn end) which contains several multifilament textile fibers. In order to create relatively thin braided structures usable for applications such as airbags, yarn ends with a relatively low linear density are used. A relatively low linear density textile fiber has a denier value of less than or about 2000. However, multifilament textile fibers and, accordingly, a multifilament yarn ends made of up such fibers generally have a round cross-section. Therefore, the low linear density yarns employed to achieve relative thinness in the braided structure will make a correspondingly small contribution to the structure's coverage area. As such, in order to increase the coverage area, more yarn ends must be introduced into the braiding process.

This can be accomplished, for example, in two ways. First, many strands which each contain a single yarn end can be incorporated by using a relatively large braiding machine with numerous carriers. Second, multiple yarn ends can be combined in a single strand or tow bundle. This can be achieved by orienting the yarn ends for each strand side-by-side or parallel in a single layer relative one another. Accordingly, the width of the strand made up of a tow bundle is distance between the outer edges of the collection of yarn ends and its thickness is the thickness of any yarn end since the yarn ends are oriented in parallel. These two approaches can also be combined such that a braiding machine with a larger number of carriers can include an increased number of yarn ends on the strand of each carrier.

We have determined that such a high coverage area braided structure can be constructed using a thin braiding material on a 336-carrier braiding machine. The 336-carrier braiding machine is a relatively large machine, using three parallel yarn ends having 500-denier high tenacity polyester per carrier for a relatively thin, wide strand or tow bundle. However, there is a disadvantage to this construction in that large 336-carrier braiding machines are relatively expensive, rare, and relatively unproductive as a function of the fineness of the weave necessary to create a high coverage area braided structure. Likewise, the 500-denier polyester requires twisting in each of the three parallel yarn ends to maintain bundle integrity. This is a relatively slow process due to the light weight of the polyester yarn.

In general, when a fabric construction is undesirably costly as a function of the fineness of the weave, more yarn ends are added in parallel to the yarn ends extant in the tow bundle. Increasing the number of yarn ends in a tow bundle is also referred to as parallel winding. As a result, there is a higher width to thickness ratio in the tow bundles to be braided. If the higher width to thickness ratio tow bundles are used on the same size machine, the coverage area of the resulting braiding structure increases. Similarly, the higher width to thickness tow bundles can produce a braided structure with the same coverage area on a braiding machine with fewer carriers. Such results are achieved based on a geometric relationship between the aspect ratio of the braiding material, the number of tow bundles or strands used, the braiding angle and the coverage area. This allows for a braided structure of equal coverage to be manufactured on a braiding machine with a reduced number of carriers. The reduction in carrier member is proportional to the increase in the width to thickness ratio achieved by parallel winding. For example, if instead of three yarn ends per stand, seven yarn ends of 500-denier polyester were employed per strand, then a fabric of equal coverage and thickness can be produced on a machine with only 144 carriers.

However, there has been a limit to the number of yarn ends which can be parallel wound in such a way that the yarn ends orient themselves next to one another in order to form a single layer of increased width without additional thickness. Beyond such limit, added yarn ends pile on top of one another or bunch together, increasing both the width and thickness of the resulting tow bundle. Theoretically due to the effects of "textile" catenary (i e., while parallel wound yarn ends are ideally of identical length, practically, variations in length in one or more of such yarn ends result in excess material which can cause bunching; increasing the number of yarn ends increases the likelihood of variations in length among such yarn ends), or other reasons presently unknown in the braiding art, low linear density fibers generally reach such limit at three yarn ends. Additional yarn ends are more difficult to parallel wind, in order to create tow bundles of additional width without additional thickness. Because of this, it is difficult to create a tow bundle using, for example, 500-denier polyester that has an effective width to thickness ratio higher than 3 to 1. For example, winding six yarn ends made of 500-denier polyester in parallel will not consistently yield a tow bundle with an aspect ratio of 6 to 1, it will instead yield a tow bundle with an incidental ratio in the area of about 2.3 to 1.

Hence, the need arises for a tow bundle with a width to thickness ratio that is suitably high to permit the production of a braided structure with a high coverage area while maintaining a small thickness.

SUMMARY OF THE INVENTION

One embodiment of our invention is directed to braiding material consisting of multiple low linear density yarn ends (containing multifilament textile fibers) oriented side-by-side or in parallel to form a generally single layer band of yarn ends and treated with a suitable forming material in order to set such orientation. The braiding material can then be used to form tow bundles for producing a braided structure. The braided structure resulting from the braiding material of our invention has a high coverage area and high width to thickness ratio.

One advantage of our invention is that the coverage area of a braided structure produced on a larger braiding machine, for example, a 336-carrier machine, can be generally maintained or improved for a braided structure produced on a smaller braiding machine, for example, a 144 or 80-carrier machine, where yarn ends are added to the tow bundles to increase the tow bundle's width without changing its thickness.

In addition, our invention can be implemented using a single yarn end for each tow bundle. For this embodiment, the braiding material is a film or other material of a suitable width to thickness ratio to provide generally the same high coverage area as the tow bundles containing parallel wound multiple yarn ends. For example, such material or film can be provided by splitting a film of a suitably high tenacity thermoplastic or thermoset material. Another suitable material is a single yarn end having a denier value of greater than 2000 (i.e., a higher linear density yarn end), which is flattened to increase the width to thickness ratio. In addition, in alternative embodiments, multiple yarn ends, for example, two yarn ends of more than 1000-denier each, can be combined in a parallel orientation and flattened in the same manner as the single yarn end. Accordingly, films and single or multiple yarn ends with a wider range of linear densities (for example, including those having greater than 2000-denier) which are manipulated to achieve a suitable width to thickness ratio can be used in alternative embodiments of our invention.

Moreover, our invention is particularly suited for automotive inflatable safety devices or airbags because that application requires low linear density high coverage braiding material in a braided structure.

BRIEF DESCRIPTION OF THE DRAWINGS

The foregoing and other features and advantages of the present invention will be more readily apparent from the following detailed description when read in conjunction with the accompanying drawings, wherein.

DETAILED DESCRIPTION OF THE INVENTION

Figure 1:
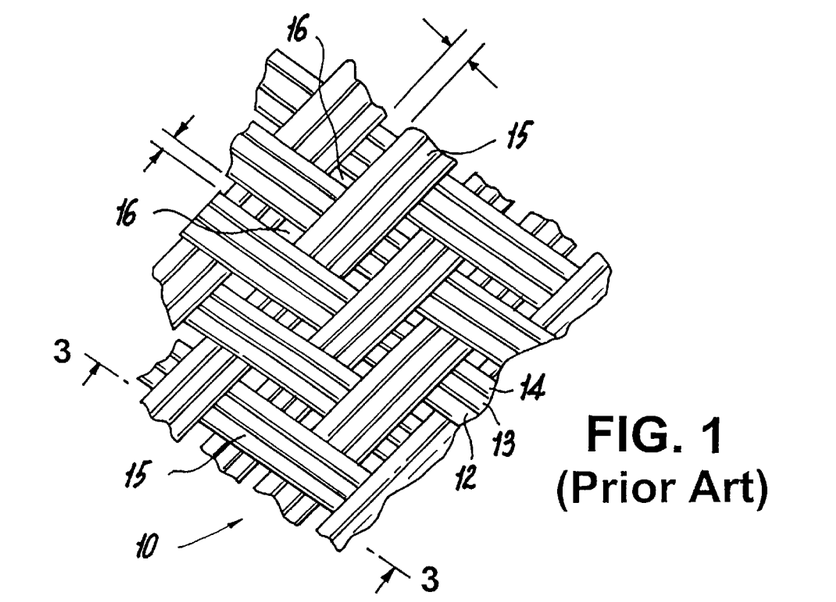
FIG. 1 is a fragmentary view of a braided structure produced by a prior art braiding material having three yarn ends and a three to one aspect ratio.
Figure 2:
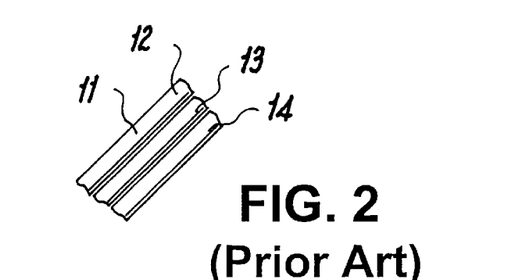
FIG. 2 is a fragmentary view of the prior art braiding material of FIG. 1.

FIGS. 1 and 2 show a braided structure 10 produced by a prior art braiding material 11 (shown in FIG. 2) on a 336-carrier braiding machine (not shown). The prior art braiding material 11 is designed to produce the braided structure 10 having a high coverage area and an aspect ratio of three to one on the 336-carrier machine. In order to create this relatively thin braiding material 11, yarn ends 12, 13, 14 of relatively low linear density must be employed. The yarn ends 12, 13, 14 optimally have generally round cross-sections and the same diameters. Also, the yarn ends 12, 13, 14 are oriented in parallel to form a single layer band by laying them side-by-side. This parallel orientation of the yarn ends 12, 13, 14 provides an aspect ratio of about three to one. We have found that such yarn ends 12, 13, 14 with an aspect ratio of about three to one will maintain their parallel orientation producing the braided structure 10. The braiding material 11 can then be used to produce a number of tow bundles 15 equal to the number of carriers (for a total of 336 tow bundles in the case of a 336-carrier braiding machine). Accordingly, the braiding material 11 as well as the tow bundles 15 have a width equal to the distance between the outmost edges of its yarn ends 12, 13, 14 or the sum of the diameters of yarn ends 12, 13, 14. Also, the material 11 and tow bundles 15 have a thickness equal to the diameter of any yarn end 12, 13, 14.

Figure 3:
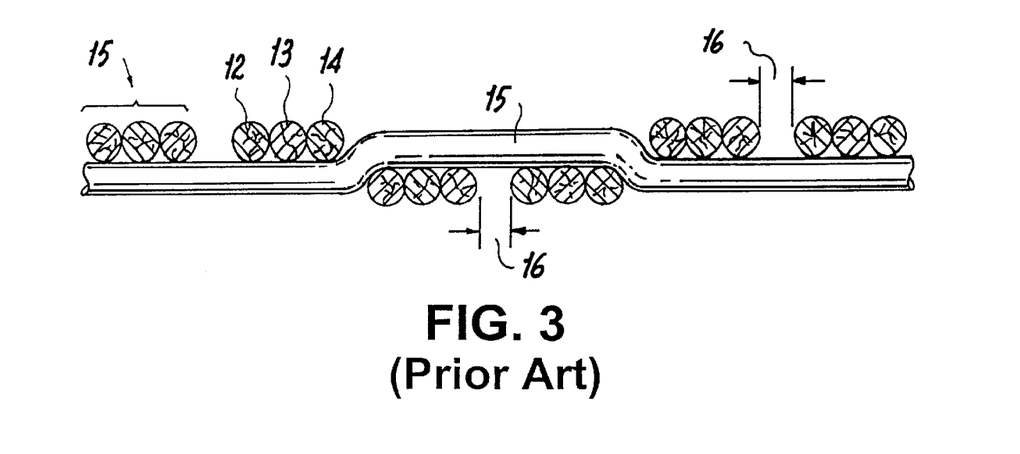
FIG. 3 is a fragmentary cross-sectional view along line 3—3 of the braided structure produced by the prior art braiding material of FIG. 1.

FIG. 3 shows a fragmentary cross-sectional view along line 3—3 of the braided structure 10 produced by the tow bundles 15 (made from the prior art braiding material 11). FIG. 3 illustrates the parallel orientation of the yarn ends 12, 13, 14 within the tow bundles 15 and the uniform thickness of the tow bundles 15 as a result of such parallel orientation.

The braided structure 10 of FIG. 1 is made up of tow bundles 15 in a standard two-over two-under braid pattern. This braid pattern is exemplary of the types of braided structures 10 which can be produced from the braiding material 11. In addition, the aspect ratio of the tow bundles 15 and the angle at which the tow bundles 15 are braided results in a particular coverage area for the braided structure 10. The coverage area indicates the amount of the braided structure's 10 surface area which contains fiber of the yarn ends 12, 13, 14 rather than gaps (appearing at the intersections of the tow bundles 15 as a result of the braiding process). FIGS. 1 and 3 illustrate the gaps 16.

EXAMPLE 1

The Braided Structure 10 Produced on a 336-Carrier Braiding Machine

The braided structure 10 can be produced on a 336-carrier braiding machine using uncoated braiding material 11 constructed according to the prior art. An example of a yarn usable for yarn ends 12, 13, 14 of the braiding material 11 is a 500-denier, 550-dtex, 96-filament TREVIRA® high tenacity polyester yarn (type 710). Other yarns usable for yarn ends 12, 13, 14 are as follows: a 440-denier, 489-dtex, 96-filament TREVIRA® high tenacity polyester yarn (type 781), having 7.5 dN/tex tenacity and 7.5% shrinkage at 350° F.; and a 220-denier, 245-dtex, 50-filament DACRON® yarn (type 68), having 7.32 dN/tex tenacity and 10.6% shrinkage at 350° F. In addition, the yarn ends 12, 13, 14 can be any type of high tenacity and preferably low shrinkage yarn currently used or hereinafter discovered for use in the braiding art, including numerous alternative TREVIRA® and DACRON® polyester yarns as well as various natural or man-made textile materials exhibiting high tenacity, such as, for example, nylon, polypropylene, polyethylene and liquid crystal polymer fiber.

The exemplary braided structure 10 illustrated in the table below has two variations. A prior art braided structures 10 having a braiding angle of 18° can be produced. In addition, the diameter of such structure 10 is 2.36 inches. The same braided structure 10 can also be inflated when used in an airbag application to a structure 10 having a braiding angle of 45°. The diameter of the structure 10 with an increased braiding angle of 45° is increased to 5.50 inches. Such exemplary structure 10 and yarn ends 12, 13, 14, each yarn end comprising 500-denier such as the TREVIRA® high tenacity polyester yarn (type 710) described above, have the following properties:

|  | EXAMPLE 1A<br>Braiding<br>Angle of 18° | EXAMPLE 1B<br>Inflated Condition<br>Braiding Angle of 45° |
|---|---|---|
| Diameter of Prior Art Braided Structure 10 (inches): | 2.36 | 5.50 |
| Yarn Ends 12, 13, 14 (500-denier polyester) Per 336-Carrier Braiding Machine: | 3 | 3 |
| Yarn Aspect Ratio | 3.01 to 1 | 3.01 to 1 |
| Coverage Area (Percent): | 91.8% | 65.4% |
| Tow Bundle 15 Width: | 0.030 | 0.030 |
| Tow Bundle 15 Thickness: | 0.010 | 0.010 |
| Raw Material Yield (yd/lb): | 8929 | 8929 |

Accordingly, the braided structure 10 has an aspect ratio of about three to one when it is produced with a braiding angle of 18° and when it is inflated so that the braiding angle is 45°. In addition, the braided structure 10 has coverage areas of 91.8% when the braiding angle is 18° and 65.4% when the braiding angle is 45°. In addition, the prior art structure 10 is not limited to the diameters illustrated above. Rather, a range of diameters of the structure 10 can be used depending on the application for which the structure 10 is implemented.

Figure 4:
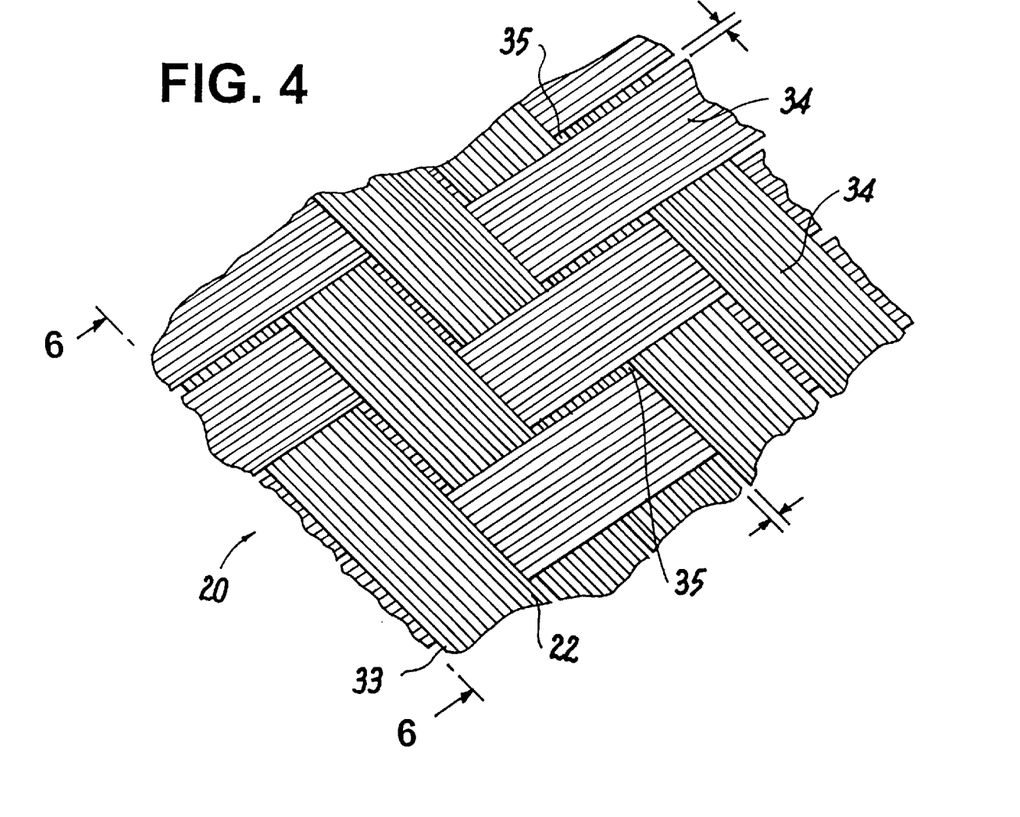
FIG. 4 is a fragmentary view of a braided structure produced by a braiding material having twelve yarn ends and a twelve to one aspect ratio according to an embodiment of the present invention.

FIG. 4 shows a braided structure 20 produced by a braiding material 21 (shown in FIG. 5) constructed according to an embodiment of the present invention. The braided structure 20 is further produced on a braiding machine (not shown) which has fewer than 336 carriers, for example 144 carriers. Moreover, the braided structure 20 is designed generally to maintain or improve the coverage area achieved with the use of the braiding material 11 on a 336-carrier machine to produce the braided structure 10. In alternative embodiments according to the present invention, the braided structure 20 can be produced on a braiding machine having a number of carriers different from 144 since the braiding material 21 constructed according to the present invention provides consistent high coverage areas and high aspect ratios for different size machines. For example, the braiding material of FIG. 3 can also be produced on an 80-carrier braiding machine. Indeed, any number of carriers presently known or hereinafter devised (which is less than the braiding carrier machine for which the braiding material 11 was designed, for example, in the illustrative embodiment, a 336-carrier machine) can be used to implement the consistent geometric features of the braiding material 21 of our invention.

Figure 5:
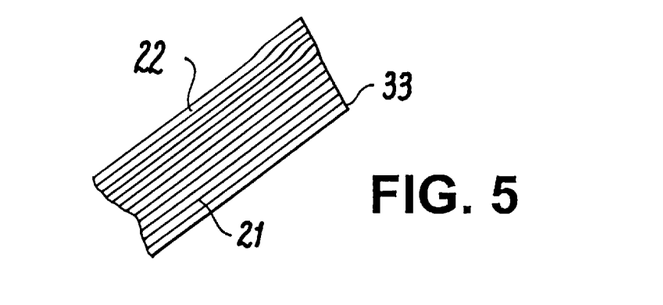
FIG. 5 is a fragmentary view of the braiding material constructed according to the embodiment of the present invention shown in FIG. 4.

Referring to FIG. 5, generally to maintain or improve the coverage area, we increased the number of yarn ends in the braiding material 21 can be increased to twelve (shown as yarn ends 22 to 33). Furthermore, the yarn ends 22 to 33 are oriented in a single layer or in parallel by lying the yarn ends side-by-side. In order to maintain the parallel orientation, the yarn ends 22 to 33 combined in such parallel orientation are coated with a forming material. The forming material can be an acrylic coating commercially designated as RHOLPLEX E-52, available from RHOM & HAAS (Philadelphia, Pa.). In alternative embodiments according to the present invention, different coatings, such as a polyurethane coating commercially designated as "/1057", available from FIBER-LINE (Hatfield, Pa.) can be used to set the tow bundles 22 to 33 in the parallel orientation. Accordingly, the invention is not limited to the coatings described herein; rather, various coatings can be used so long as the coatings set the parallel orientation of the tow bundles 22 to 33.

The process of combining and coating the yarns 22 to 33 according to the present invention can include drawing the yarn ends 22 to 33 from a creel, arranging them side-by-side in parallel to form a single layer band or tow bundle 34, directing them into a bath of heat settable coating material, passing the braiding material 21 through a wiper die to control the amount of coating applied and then conveying the coated braiding material 21 through an oven to set the coating. This yields a high tenacity braiding material 21 with a high width to thickness ratio that is suitably flexible to process on a braiding machine while sufficiently stiff to maintain its width dimension without the individual yarn ends bunching over one another or buckling in an undesirable manner. The method of lying yarn ends in parallel is standard and can be accomplished in a variety of ways, which are known in the art. In addition, the process of coating textile fibers is also standard. For example, the coating process can be implemented on a standard coating machine commercially designated as the TS2 COATING TOWER WINDER, sold by DIETZE & SCHELL MASCHINENFABRIK Gmbh (Coburg, Germany). Accordingly, the present invention is not limited by the process by which yarn ends are placed in parallel orientation or are coated.

Referring once again to FIGS. 4 and 6, the braiding material 21 is used to provide a series of tow bundles 34. In this way, the width of the tow bundles 34 is increased by a factor of about four while the thickness of the braiding material is constant. The tow bundles 34 are then interlaced to the produce the braided structure 20 on a braiding machine with, for example, 144 carriers. As a result, the braiding material 21, with a higher aspect ratio, provides the same or greater coverage area with the same thickness as the braided structure 10. In addition, the braided structure 20 will have gaps 35 resulting from the intersection of the two bundles 34 which are proportional to the gaps 16 in the braided structure 10 to support the same or increased coverage area of the braided structure 20.

Figure 6:
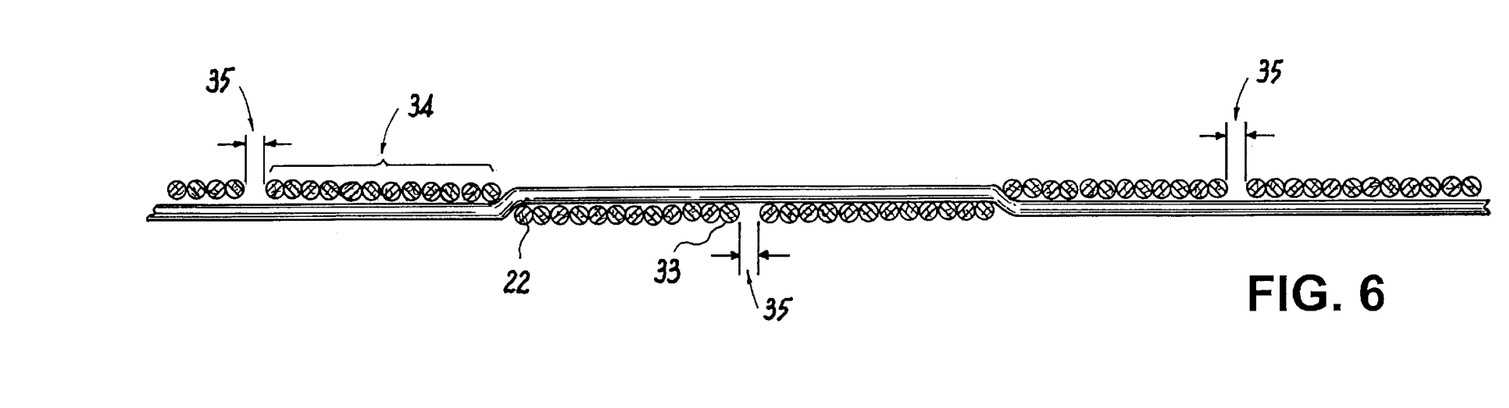
FIG. 6 is a fragmentary cross-sectional view along line 6—6 of the braided structure produced by the braiding material constructed according to the embodiment of the present invention shown in FIG. 4.

Referring to FIG. 6, there is shown a fragmentary cross-sectional view along line 6—6 of the braided structure 20 produced by the tow bundles 34 (made from the braiding material 21). FIG. 6 illustrates the parallel orientation of the yarn ends 22 to 33 within the tow bundles 34 and the uniform thickness of the tow bundles 34 as a result of such parallel orientation.

The braided structure 20 (like the prior art braided structure 10) is formed from a standard two-over two-under braid pattern. The braided structure 10 can also be free-standing (i.e., braided without a mandrel or other inner core). More particularly, the braided structure 20 includes the basic repeating pattern in which tow bundles 34 are in side-by-side interlaced relation for one direction of a helical advance, and in which a second series of tow bundles 34 are in similar side-by-side relation for the opposite direction of a helical advance. The braiding process for production of this standard braid pattern is known in the art. Therefore, it will not be described further herein. In addition, this braided structure 20 is merely exemplary of braided structures which may be produced using the braiding material 21 because the braiding material 21 can be used to produce a braided structure 20 with any braid pattern. Accordingly, the braided structure 20 braid pattern or configuration does not limit the present invention.

EXAMPLE 2

The Braided Structure 20 Produced on a 144-Carrier Braiding Machine

The braided structure 20 can be produced on a 144-carrier braiding machine using precoated braiding material 21 constructed according this embodiment shown in FIG. 5 of the present invention. The same yarns used for Example 1 to produce the braided structure 10 can also be employed for this exemplary structure 20. The exemplary braided structure 20 illustrated in the table below has two variations. A braided structures 20 having a braiding angle of 18° can be produced. The same braided structure 20 can also be inflated when used in an airbag application to a structure 20 having a braiding angle of 45°. Such exemplary structure 20 and yarn ends 22 to 33, each yarn end comprising 220-denier polyester, have the following properties:

|  | EXAMPLE 2A | EXAMPLE 2B |
| --- | --- | --- |
|  | Braiding Angle of 18° | Inflated Condition Braiding Angle of 45° |
| Diameter of Braided Structure 20 (inches): | 2.36 | 5.50 |
| Yarn Ends 22 to 33 (220-denier polyester) Per 144-Carrier Braiding Machine: | 12 | 12 |
| Yarn Aspect Ratio | 12.01 to 1 | 12.01 to 1 |
| Coverage Area (Percent): | 90.8% | 64.3% |
| Tow Bundle 34 Width: | 0.068 | 0.068 |
| Tow Bundle 34 Thickness: | 0.006 | 0.006 |
| Raw Material Yield (yd/lb): | 20160 | 20160 |

Accordingly, the braided structure 20 has an aspect ratio of about twelve to one when it is produced with a braiding angle of 18° and when it is inflated so that the braiding angle is 45°. In addition, the braided structure 20 has coverage areas of 90.8 % when the braiding angle is 18° and 64.3% when the braiding angle is 45°. In addition, the present invention is not limited to the diameters illustrated above for the exemplary structure 20. Rather, the present invention applies to the structure 20 with a range of diameters depending on the application for which the structure 20 is implemented.

EXAMPLE 3

The Braided Structure 20 Produced on a 80-Carrier Braiding Machine

In addition, in alternative embodiments according to the present invention, the braided structure 20 can have tow bundles 34 produced from braiding material 21 with twenty-four yarn ends (not shown). For such alternative embodiments, the resulting tow bundle aspect ratio of about twenty-four to one will generally increase the coverage area on braiding machines having fewer than 336 carriers. For example, the low linear density yarns used to produce the braided structure 10 can also be employed for this exemplary structure 20. The exemplary braided structure 20 illustrated in the table below has the same two variations as shown for Example 2. Such exemplary structure 20 and twenty-four yarn ends, each yarn end comprising 100-denier polyester, have the following properties:

|  | EXAMPLE 3A Braiding Angle of 18° | EXAMPLE 3B Inflated Condition Braiding Angle of 45° |
| --- | --- | --- |
| Diameter of Braided Structure 20 (inches): | 2.36 | 5.50 |
| Yarn Ends (twenty-four; 100-denier polyester) Per 80-Carrier Braiding Machine: | 24 | 24 |
| Yarn Aspect Ratio | 24 to 1 | 24 to 1 |

-continued

|  | EXAMPLE 3A<br>Braiding<br>Angle of 18° | EXAMPLE 3B<br>Inflated Condition<br>Braiding Angle of 45° |
|---|---|---|
| Coverage Area (Percent): | 98.4% | 75.4% |
| Tow Bundle Width: | 0.103 | 0.103 |
| Tow Bundle Thickness: | 0.004 | 0.004 |
| Raw Material Yield (yd/lb): | 44640 | 44640 |

Accordingly, the braided structure 20 has an aspect ratio of about twenty-four to one when it is produced with a braiding angle of 18° and when it is inflated so that the braiding angle is 45°. In addition, the braided structure 20 has coverage areas of 98.4% when the braiding angle is 18° and 75.4% when the braiding angle is 45°. In addition, the same variations in diameter as for the structure 20 in Example 2 apply to this Example 3 structure 20.

Moreover, the present invention is not limited by the examples of twelve or twenty-four yarns. Rather, it is contemplated that tow bundles having any aspect ratio of greater than three to one to be within the scope of the present invention, such that the precise numbers of yarn ends is a design choice based on the particular application for the braided structure 20.

In addition, in alternative embodiments according to the present invention, the tow bundles 34 need not derive from the same braiding material 11. Rather, the tow bundles can be produced from braiding material with variations in aspect ratios based on the use of different yarns or different number of yarn ends per tow bundle. The braided structure resulting from braiding such tow bundles can be symmetrical but have variations in the coverage area on portions of the braided structure surface or asymmetrical due to an asymmetrical placement of various width to thickness ratio tow bundles. However, where the braided structure is produced on a given machine (with a given number of carriers, for example 336), the same principles of our invention can be applied to produce the same braided structure using such variations in tow bundles on a braiding machine with fewer carriers.

Figure 7:
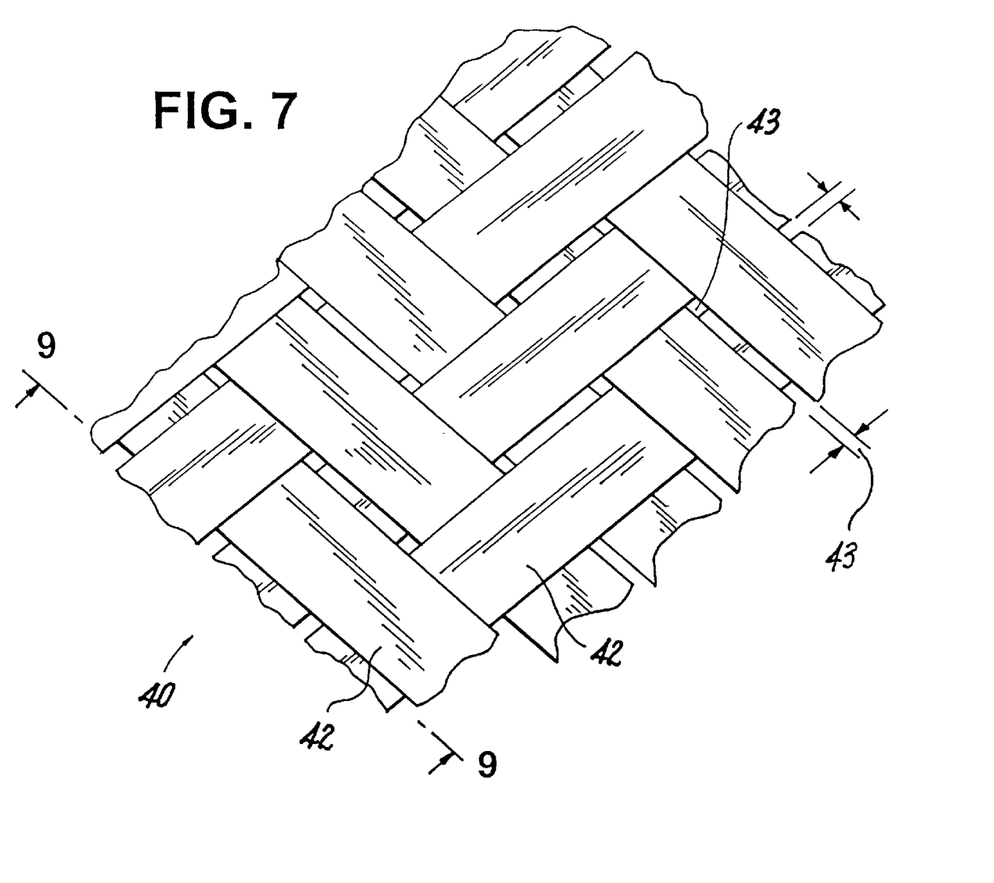
FIG. 7 is a fragmentary view of a braided structure produced by a braiding material having a monofilament according to a second embodiment of the present invention.

FIG. 7 shows a braided structure 40 produced by a braiding material 41 (shown in FIG. 6) constructed according to another embodiment of the present invention. The braided structure 40 is further produced on a braiding machine (not shown) which has fewer than 336 carriers, for example 144 carriers. Moreover, the braided structure 40 is designed generally to maintain or improve the coverage area achieved with the use of the braiding material 11 to produce the braided structure 10 of FIGS. 1 to 3 on a 336-carrier machine. Like the braided structure 20 of FIGS. 4 to 6, in alternative embodiments according to the present invention, the braided structure 40 can be produced on carrier braiding machine having a different number of carriers (e.g., 80 carriers), since the braiding material 41 allows for consistent high coverage area and high aspect ratio for different size machines.

Figure 8:
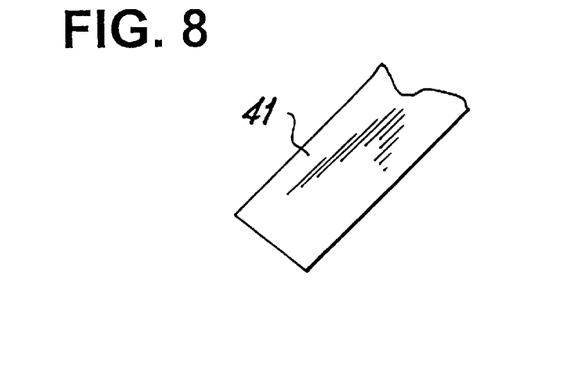
FIG. 8 is a fragmentary view of the braiding material constructed according to the second embodiment of the present invention shown in FIG. 7.

Referring to FIG. 8, the braiding material 41 of this embodiment of the present invention is a monofilament of engineered plastic film, such as, for example, nylon or polyester. More particularly, an example of a usable film is a biaxially oriented polyester film commercially designated TRANSPET® available from TRANSILWRAP COMPANY, INC. (Chicago, Ill.), which film has an ultimate tensile strength of 32,000 psi. This braiding material 41 can be preconfigured with a suitable aspect ratio to achieve the same or greater coverage area compared to the braided structure 20 (and each of the alternative embodiments described above for the structure 20). In addition, in alternative embodiments of the present invention, a braiding material 41 can be manipulated (for example flattened or stretched) to achieve the desired aspect ratio for the tow bundles 42 of the braided structure 40. For example, a engineered plastic can be further flattened.

In addition, in alternative embodiments according to the present invention, alternative materials can be used for the braiding material 41. For example, one or more yarn ends having a greater range of linear densities (for example, low linear densities or greater than 2000-denier) can be parallel wound and flattened in the same manner as the engineered plastic film to produce a desired aspect ratio for the two bundle 42. The following are examples of usable materials 41: two 1000-denier, 1110-dtex, 200-filament TREVIRA® high tenacity polyester yarns (type 710), having 7.4 dN/tex tenacity and 1.6% shrinkage at 350° F., can be oriented in parallel and then flattened to increase the aspect ratio of the resulting tow bundle. Moreover, a single 2600-denier, 2890-dtex, 384-filament TREVIRA® high tenacity polyester yarn (type 785), having 7.90 dN/tex tenacity and 13.20% shrinkage at 350° F., can be used as a monofilament and manipulated in the same manner as the engineered plastic film to produce a desired aspect ratio for the tow bundle 42. Accordingly, the monofilament or series of yarn ends used to construct the braiding material 41 does not limit the scope of the present invention. Rather, it is contemplated that a variety of materials can be used as configured or manipulated to produce a high aspect ratio for a desired coverage area of the braided structure 40.

Moreover, depending on the type of braiding material 41 used to produce the braided structure 40, a coating can be applied to film. For example, for the monofilament shown in FIGS. 7 to 9, a coating may not be necessary since the monofilament is a single unit. However, a coating may be employed in order to prevent curling of the outer edges of such monofilament. Moreover, in alternative embodiments in which the braiding material 41 consists of one or a series of higher denier yarns, a coating may be applied as to the single higher denier yarn or to the series of high denier yarns for the reasons provided as to the monofilament or the braiding material 20, for example. The method for coating the braiding material 41 consisting of a film is the same as that for the braiding material 21 described above, and is similarly known in the art. For example, the same coating machine TS2 Coating Tower Winder can be used to coat such film.

Referring once again to FIGS. 7 and 8, the braiding material 31 is used to provide a series of tow bundles 43. The width and thickness of the tow bundles 42 is the same as the braiding material 41. The tow bundles 42 are then interlaced to the produce the braided structure 40 in the same manner as for the braided structure 20, including using such braiding material 41 for the same alternative braid patterns and on the same alternative braiding machines having a variety of carriers as for such structure 20. In addition, the braided structure 40 will have gaps 43 resulting from the intersection of the tow bundles 42 which are proportional to the gaps 16 in the braided structure 10 to support the same or increased coverage area of the braided structure 40. The braided structure 40 (like the prior art braided structure 10) is formed as shown from a standard two-over two-under braid pattern. As described above, the braid pattern shown does not limit the present invention such that braiding material 41 can be used to produce braided structures 40 with different braid patterns.

Figure 9:
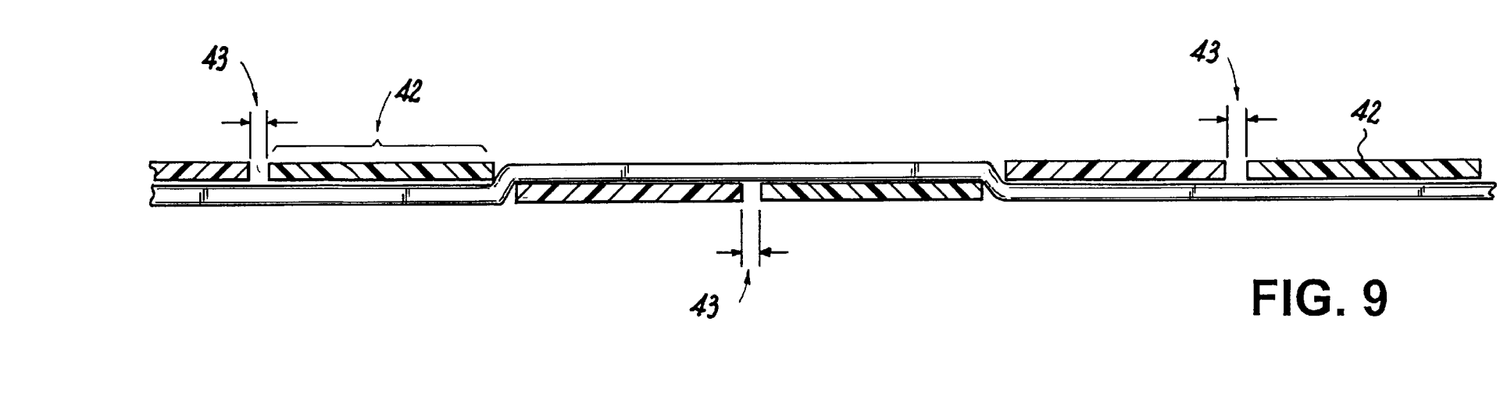
FIG. 9 is a fragmentary cross-sectional view along line 9—9 of the braided structure produced by the braiding material constructed according to the second embodiment of the present invention shown in FIG. 8.

Referring to FIG. 9, there is shown a fragmentary cross-sectional view along line 9—9 of the braided structure 40 produced by the tow bundles 42 (made from the braiding material 41). FIG. 9 illustrates the braiding material 41 consisting of a monofilament having a rectangular configuration.

EXAMPLE 4

The Braided Structure 40 Produced on a 96-Carrier Braiding Machine

The braided structure 40 can be produced on a 96-carrier braiding machine using precoated or uncoated braiding material 41 consisting of a monofilament consisting of 1500-denier polyester film and constructed according to the embodiment shown in FIG. 7. The exemplary braided structure 40 is shown in the same variations as Examples 1 to 3. The resulting braided structures 40 and monofilament 41, comprising 1500-denier polyester film, have the following properties:

|  | EXAMPLE 4A<br>Braiding<br>Angle of 18° | EXAMPLE 4B<br>Inflated Condition<br>Braiding Angle of 45° |
| --- | --- | --- |
| Diameter of Braided Structure 40 (inches): | 2.36 | 5.50 |
| Monofilament 41 (1500-denier polyester film) Per 96-Carrier Braiding Machine: | 1 | 1 |
| Yarn Aspect Ratio | 58.50 to 1 | 58.50 to 1 |
| Coverage Area (Percent): | 97.8% | 74.2% |
| Tow Bundle 42 Width: | 0.125 | 0.125 |
| Tow Bundle 42 Thickness: | 0.002 | 0.002 |
| Raw Material Yield (yd/lb): | 2976.33 | 2976.33 |

Accordingly, the braided structure 40 has an aspect ratio of about fifty-nine to one when it is produced with a braiding angle of 18° and when it is inflated so that the braiding angle is 45°. In addition, the braided structure 40 has coverage areas of 97.8% when the braiding angle is 18° and 64.3% when the braiding angle is 45°. In addition, the present invention is not limited to the diameters illustrated above for the Example 4 structure 40. Rather, the present invention applies to the Example 4 structure 40 with a range of diameters of about three inches or greater at a braiding angle of 45°.

EXAMPLE 5

The Braided Structure 40 Produced on a 72-Carrier Braiding Machine

In addition, in alternative embodiments according to the present invention, the braided structure 40 can have tow bundles 42 produced from braiding material 41 with a single 2000-denier yarn end which has been flattened to achieve the desired width to thickness ratio (not shown). In further alternative embodiments, the material 41 can also be coated. The resulting tow bundle aspect ratio generally will increase the coverage area on braiding machines having fewer than 336 carriers. The exemplary braided structure 40 is shown in the same variations as in Examples 1 to 4. The resulting braided structures 40 and monofilament 41, comprising 2000-denier polyester, have the following properties:

|  | EXAMPLE 5A<br>Braiding<br>Angle of 18° | EXAMPLE 5B<br>Inflated Condition<br>Braiding Angle of 45° |
| --- | --- | --- |
| Diameter of Braided Structure 40 (inches): | 2.36 | 5.50 |
| Monofilament 41 (2000-denier polyester) Per 72-Carrier Braiding Machine: | 1 | 1 |
| Yarn Aspect Ratio | 93.33 to 1 | 93.33 to 1 |
| Coverage Area (Percent): | 100% | 83.1% |
| Tow Bundle 42 Width: | 0.200 | 0.200 |
| Tow Bundle 42 Thickness: | 0.002 | 0.002 |
| Raw Material Yield (yd/lb): | 2232 | 2232 |

Accordingly, the braided structure 40 has an aspect ratio of about ninety to one when it is produced with a braiding angle of 18° and when it is inflated so that the braiding angle is 45°. In addition, the braided structure 40 has coverage areas of 100% when the braiding angle is 18° and 83.1% when the braiding angle is 45°. In addition, the same variations in diameter as for the structure 40 in Example 4 apply to this Example 5 structure 40.

Figure 10:
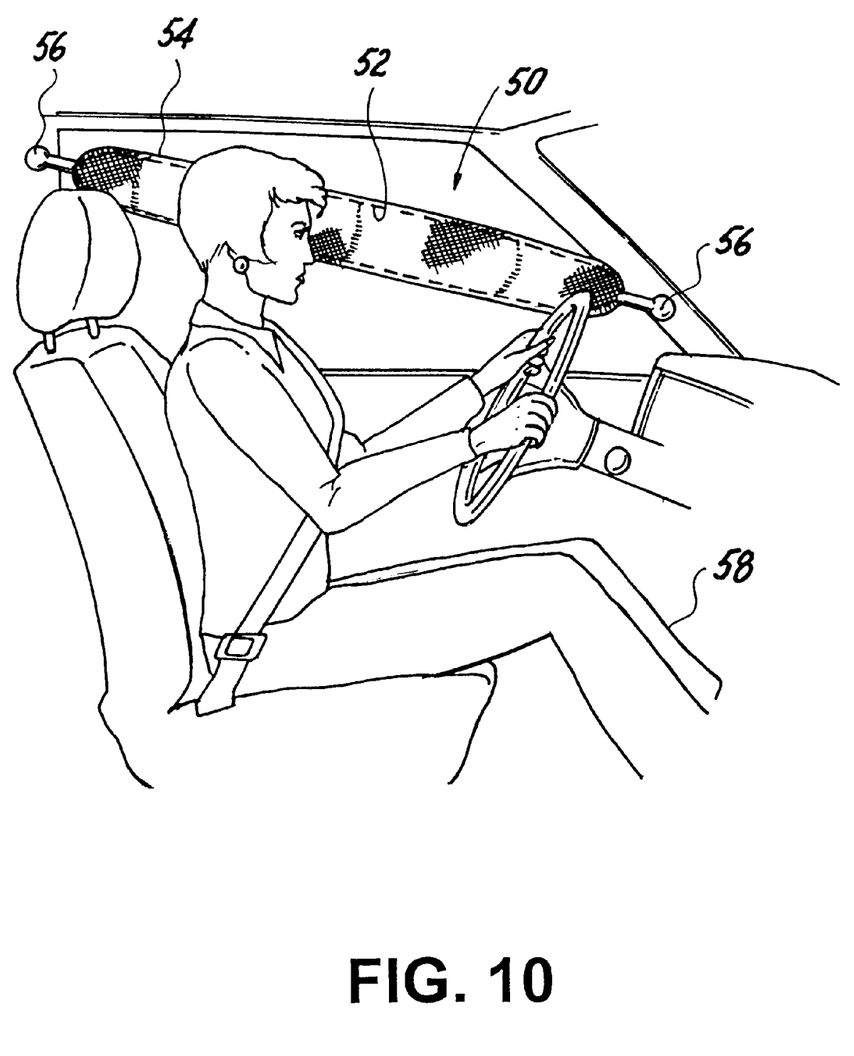
FIG. 10 is a side view of an automotive inflatable safety device as an application of the braided structure of the present invention.

A particular application of the braiding material 20 and 40 constructed according to the present invention is in automotive inflatable safety devices because it has suitable tenacity to withstand the inflation and impact forces which act on it and has a sufficiently small thickness to allow for compact storage of the braided structure. FIG. 10 is a side view of an automotive inflatable safety device as an application of the braided structure of the present invention. The safety device 50 includes an inflatable bladder 52, an expandable braid 54 and attachments 56 to secure the safety device to a car. In addition, this safety device 50 is used for head protection of, e.g., occupant 58. The braid 54 can be any type of braided structure which has been described herein, such as, e.g., any of the braided structures 20 described in examples 2–5 above.

Having thus described the present invention, it is to be understood that the above-described braided structure embodiments are illustrative of the principles of the present invention and that other braided structure embodiments may be devised by those skilled in the art, without departing from the spirit and scope of the invention. In particular, the invention contemplates that the braiding material constructed according to the invention can support producing a braided structure having roughly the same or increased coverage area of a braided structure designed with a desired coverage area on a braiding machine having a large number of carriers, for example, a 336-carrier braiding machine. Accordingly, the invention is not to be considered limited by the specific examples illustrated herein, but by the appended claims.

What is claimed is:

1. A high coverage, high width to thickness ratio single layer braided structure, said braided structure comprising:

a plurality of strands, each of said plurality of strands including at least four low linear density yarn ends, each of said yarn ends being oriented side-by-side to define a generally single layer band and treated with a forming material to set said side-by-side orientation of said yarn ends;

each of said plurality of strands further having a width defined generally by the outmost edges of its said yarn ends and, a width to thickness ratio of at least about four to one; and     an interlacing pattern of said plurality of strands, said interlacing pattern producing a braided structure with a coverage area of more than substantially 64%, producing a single layer braided structure.

2. The braided structure in accordance with claim 1 wherein each of said plurality of strands has at least twelve low linear density yarn ends and said width to thickness ratio is at least about twelve to one.

3. The braided structure in accordance with claim 1 wherein each of said plurality of strands has at least twenty-four low linear density yarn ends and said width to thickness ratio of at least about twenty-four to one.

4. An automotive inflatable safety device comprising:
   an inflatable bladder; and
   the braided structure according to claim 1 enveloping said bladder.

5. The braided structure in accordance with claim 1 wherein said braided structure is free-standing.

6. The braided structure in accordance with claim 1 wherein said plurality of strands is less than 336.

7. The braided structure in accordance with claim 1 wherein said plurality of strands is one of 144, 120, 96, 80 and 72.

8. A high coverage, high width to thickness ratio braided structure, said braided structure comprising:
   a plurality of strands, each of said plurality of strands including a film having a width to thickness ratio of at least about four to one; and
   an interlacing pattern of said plurality of strands produced by weaving said plurality of strands to provide said braided structure which is tubular and has a diameter of at least three inches and a coverage area of at least 40%.

9. An automotive inflatable safety device comprising:
   an inflatable bladder; and
   the braided structure according to claim 8 enveloping said bladder.

10. The braided structure in accordance with claim 8 wherein said plurality of strands is less than 336.

11. The braided structure in accordance with claim 8 wherein said plurality of strands is one of 144, 120, 96, 80 and 72.

12. The braided structure in accordance with claim 8 wherein said film is polyester.

13. The braided structure in accordance with claim 8 wherein said film is treated with a forming material.

14. A high coverage, high width to thickness ratio braided structure, said braided structure comprising:
   a plurality of strands, each of said plurality of strands including at least one yarn end of about 1000 or more denier and being flattened to produce a width to thickness ratio of at least four to one; and
   an interlacing pattern of said plurality of strands.

15. The braided structure in accordance with claim 14 wherein:
   said plurality of strands includes at least two yarn ends, each of said at least two yarn ends being flattened and oriented side-by-side to define a generally single layer band; and
   each of said plurality of strands further having a width defined generally by the outmost edges of its said at least two yarn ends and a width to thickness ratio of at least about four to one.

16. The braided structure in accordance with claim 15 wherein said yarn end is treated with a forming material.

17. The braided structure in accordance with claim 14 wherein said yarn end is treated with a forming material.

18. An automotive inflatable safety device comprising:
   an inflatable bladder; and
   the braided structure according to claim 14 enveloping said bladder.

19. The braided structure in accordance with claim 14 wherein said braided structure is free-standing.

20. The braided structure in accordance with claim 14 wherein said plurality of strands is less than 336.

21. The braided structure in accordance with claim 14 wherein said plurality of strands is one of 144, 120, 96, 80 and 72.

22. A method of producing a single layer braided structure on a braiding machine having less than 336 carriers, said method comprising the steps of:
   forming a braiding material by orienting at least four low linear density yarn ends side-by-side to define a generally single layer band and treating said single layer band with a material to set said side-by-side orientation in said braiding material;
   forming a plurality of strands from said braiding material; and
   interlacing each of said plurality of strands into said single layer braided structure with a coverage area of more than substantially 64% on said braiding machine having less than 336 carriers.

23. A method of producing a first single layer braided structure on a braiding machine having less than 336 carriers, said first single layer braided structure having a first coverage area over a range of diameters of said first single layer braided structure generally equal to or greater than a second coverage area over said range of diameters of a second single layer braided structure produced by a second braiding material on a 336 carrier machine, said second braiding material including three of a plurality of low linear density yarn ends, said method comprising the steps of:
   forming a first braiding material by orienting at least four of said plurality of low linear density yarn ends side-by-side to define a generally single layer band and treating said single layer band with a material to set said side-by-side orientation in said first braiding material;
   forming a plurality of strands from said first braiding material; and
   interlacing each of said plurality of strands on said braiding machine having less than 336 carriers to produce said first single layer braided structure having said first coverage area of more than substantially 64%.

24. A method of producing a first single layer braided structure on a braiding machine having less than 336 carriers, said first single layer braided structure having a first coverage area over a range of diameters of said first single layer braided structure generally equal to or greater than a second coverage area over said range of diameters of a second single layer braided structure produced by a second braiding material on a 336 carrier machine, said second braiding material including a plurality of low linear density yarn ends, comprising the steps of:
   forming a first braiding material by orienting a plurality of yarn ends which are greater in number than said plurality of yarn ends of said single layer second braided structure side-by-side to define a generally single layer band and by treating said single layer band with a material to set said side-by-side orientation in said first braiding material;
   forming a plurality of strands from said first braiding material; and interlacing each of said plurality of strands on said braiding machine having less than 336 carriers to produce said first single layer braided structure having said first coverage area of more than substantially 64%.

25. A method of producing a single layer braided structure on a braiding machine having less than 336 carriers, said method comprising the steps of:

forming a braiding material of a monofilament;

forming a plurality of strands from said braiding material; and interlacing each of said plurality of strands on said braiding machine having less than 336 carriers to produce said single layer braided structure which is tubular and has a diameter of at least three inches and a coverage area of more than substantially 64%.

26. A method of producing a braided structure on a braiding machine having less than 336 carriers, said method comprising the steps of:

forming a braiding material of at least one yarn end, said yarn end being flattened to form a generally single layer band;

forming a plurality of strands from said braiding material; and interlacing each of said plurality of strands on said braiding machine having less than 336 carriers to produce said braided structure which is tubular and has a diameter of at least three inches and a coverage area of more than substantially 64%.

27. A method of producing a single layer braided structure on a braiding machine having less than 336 carriers, said method comprising the steps of:

forming a braiding material of one of a monofilament and at least one yarn end flattened to form a generally single layer band;

forming a plurality of strands from said braiding material; and interlacing each of said plurality of strands on said braiding machine having less than 336 carriers to produce said single layer braided structure which is tubular and has a diameter of at least three inches and a coverage area of more than substantially 64%.

* * * * *